May 19, 1936.　　V. W. KLIESRATH　　2,041,475
CLUTCH CONTROL MECHANISM
Original Filed Aug. 28, 1931
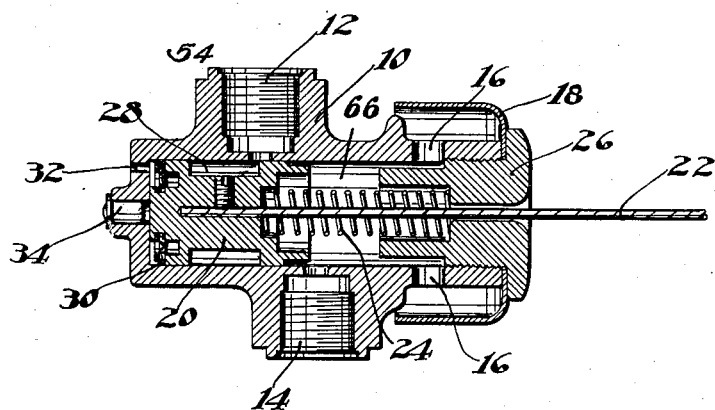
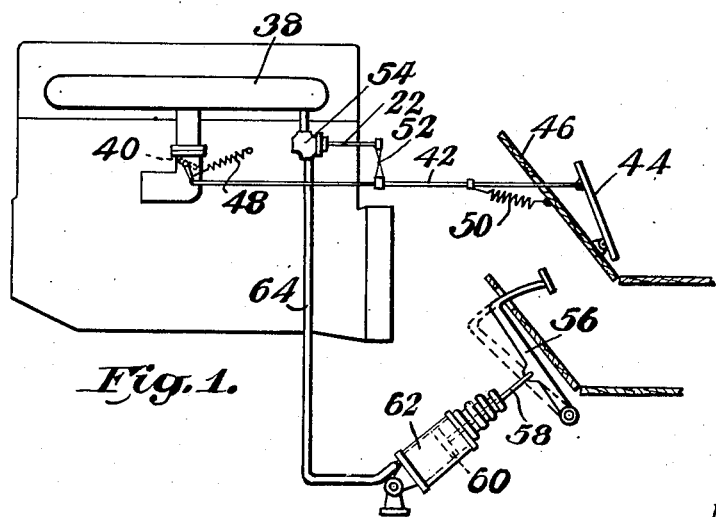
INVENTOR.
VICTOR W. KLIESRATH
BY H. O. Clayton
ATTORNEY Patented May 19, 1936

2,041,475

UNITED STATES PATENT OFFICE 2,041,475

CLUTCH CONTROL MECHANISM

Victor W. Kliesrath, South Bend, Ind., assignor, by mesne assignments, to Bragg-Kliesrath Corporation, South Bend, Ind., a corporation of New York Original application August 28, 1931, Serial No. 559,988. Divided and this application October 10, 1931, Serial No. 568,081. Renewed August 6, 1934

2 Claims. (Cl. 251—76)

This invention relates to valves, and particularly to the piston type of valve readily adaptable as a distributor for an automotive vacuum brake system of the type disclosed in Belcia Patent No. 1,470,272, dated October 9, 1923.

This patent discloses a valve for a clutch controlling vacuum operated fluid actuator, the two operative positions of the valve piston effecting either intercommunication between the source of vacuum and the actuator or between the atmosphere and the actuator to energize and deenergize the same.

The present invention, although not necessarily limited to use in a power brake system, is designed as an improvement over the valve of the aforementioned patent. The principal object of the invention is to provide a very simple type of piston valve of relatively few parts and, accordingly, economical of manufacture and unvarying in operation.

Other objects and desirable details of construction of the valve will become apparent from the following detailed description of a preferred embodiment of the invention.

In the drawing, submitted for purposes of illustration only, and not intended as a definition of the scope of the invention, reference being had for that purpose to the subjoined claims:

Figure 1 is a diagrammatic longitudinal section through a portion of an automobile, showing the valve of the present invention in operative position; and Figure 2 is a longitudinal sectional view of the control valve shown in Figure 1.

In the arrangement illustrated, the vehicle has an engine 36 provided with a manifold 38, the engine speed being controlled by means such as a throttle 40 actuated through a connection 42 from an accelerator 44, shown as a pedal pivotally mounted on the floor-board 46. Springs 48 and 50 are provided and normally urge the throttle valve 40 and accelerator 44 to their closed positions. An arm 52 fixed to the connection 42 receives one end of the flexible connection 22 and serves to actuate the piston 20 of the valve member 54 in accordance with the position of the pedal 44.

The engine 36 is connected to the road wheels through a transmission and a clutch (not shown) in the usual manner, the clutch being operated by means such as the usual clutch pedal 56. This clutch pedal is shown connected, by means such as a link 58, to a piston 60 in a vacuum cylinder 62, the piston and cylinder forming a vacuum power actuator for the clutch. Cylinder 62 is connected to the manifold 38 by a conduit 64, to actuate the clutch by the power of the manifold suction. The passage through the conduit 64 is controlled by means such as a valve 54 shown in detail in Figure 2.

As disclosed, the valve comprises a casing 10 having a port 12 adapted to provide communication, by a conventional conduit, with a source of vacuum, such as the intake manifold 38 of an automotive internal combustion engine. The casing is furthermore provided with a port 14 adapted to provide communication with a power actuator or fluid motor of the cylinder and piston type disclosed in the aforementioned Belcia patent, and is also provided with atmospheric outlets 16, preferably covered by a guard 18. The movable element of the valve comprises a piston 20 which is actuated by a flexible cable 22 against the resistance of a spring 24, the latter interposed between the recessed ends of the valve piston and a valve closure plug 26.

The valve piston is shown in its extreme left position in the figure of the drawing, communication being provided between the atmosphere and the actuator via ports 16 and port 14. In this position of the valve parts the actuator or fluid motor is deenergized or inactive. Actuation of the cable 22, i. e. by the accelerator pedal, serves to move the piston 20 to the right, compressing spring 24 and registering a recess 28 in the piston with ports 12 and 14 to energize the motor by placing it in communication with the source of vacuum. Release of tension upon the cable 22 permits the spring 24 to expand and reestablish communication between the atmosphere and actuator to render the latter inactive. A gasket 30 is provided to obviate piston leakage and an opening 32 is provided to insure the movement of the piston within the casing, the size of the aforementioned opening determining the rate of influx and efflux of air into and from the chamber outlined by the cylinder end wall, the piston and the cylinder body and, therefore, predetermines the timing of the valve operation, particularly in the venting of the actuator to atmosphere.

The valve may also be provided with an oiler device 34 to facilitate lubrication of the movable piston.

There is thus provided a very simple valve structure of relatively few parts, the particular dashpot structure in the end of the valve insuring a definite rate of movement of the valve piston under the action of the spring 24 to thereby predetermine the time of opening of the valve to atmosphere and also predetermine the elapsed time in completing said opening. Such an action is particularly effective in timing the initiation of the valve opening with respect to other automotive control mechanisms, such as the throttle, which may be synchronized with the operation of the controlling valve.

In the operation of the device as thus far described, when the accelerator 44 is depressed, as normally when the car is being driven on the road, spring 24 is permitted to shift the valve piston 20 to the extreme left, thereby connecting air passages 16 through the bore 66 of the valve with the lower section of the conduit 64 and therefore with the vacuum cylinder 62. Thus the usual clutch spring (not shown) holds the clutch engaged, with the clutch pedal 56 in its upper (full-line) position.

If now the accelerator 44 is released, springs 48 and 50 shift the various parts, spring 48 first closing the throttle 40 and then, with the engine idling, spring 50 acts through the connection 42 and arm 52 to actuate flexible connection 22 to move valve 20 to the right thereby compressing spring 24 and bringing the annular space 28 in the valve piston 20 into registry with opening 14 which communicates with the vacuum cylinder 62. Space 28 is at all times in registry with the opening 12 communicating with the manifold 38. Therefore the suction from the manifold pulls the clutch pedal into the dotted-line position, thereby disengaging the clutch.

It will also be apparent that the aforementioned valve is not necessarily limited to its use in a vacuum system, but may with equal facility be employed in an air pressure system wherein compressed air is transmitted via ports 12 and 14 of the valve to energize the fluid motor.

This application constitutes a division of United States application No. 559,988, filed August 28, 1931.

While one illustrative embodiment has been described, it is not my intention to limit the scope of the invention to that particular embodiment, or otherwise than by the terms of the appended claims.

I claim:

1. A three-way control valve for a pressure differential operated fluid motor comprising a casing member having inlet, outlet and venting ports, a plug member threaded into one end of said casing, said member being provided with a recess in one end thereof, a piston member reciprocably mounted within said casing, said piston being provided with a recess in its end face opposite the recess in the aforementioned plug member and further provided with a recess intermediate its end portions adapted, in one position of the piston, to intercommunicate the inlet and outlet ports of the casing, said piston in said position shutting off communication with said venting port, a piston operating spring lying within and tensioned between the aforementioned recesses, and piston operating means extending through said plug and spring and secured at its end to said piston member.

2. A control valve for a fluid pressure actuated motor comprising a longitudinal casing member having a recessed member closing one end thereof, a port in the casing member adapted to communicate with said motor, a plurality of other ports in said casing member on the side thereof diametrically opposite to the side in which is positioned the aforementioned port adapted to communicate with a source of differential fluid pressure and atmosphere respectively, a piston slidable within said casing member, said piston being recessed in one end thereof, yieldable means urging the piston toward one extreme position and fitting within the aforementioned recess in the piston, actuating means projecting through said recessed closure member and operably connected to a portion of said piston to move the latter to another extreme position against the resistance of said yieldable means, and a circumferential groove in a portion of said piston operative to connect said motor with said source of differential fluid pressure when the piston is moved to one of its extreme positions in the casing.

VICTOR W. KLIESRATH.